US012369757B2

(12) United States Patent
Tognarelli

(10) Patent No.: US 12,369,757 B2
(45) Date of Patent: Jul. 29, 2025

(54) HAND TOOL

(71) Applicant: WOW GEAR, LLC, Santa Barbara, CA (US)

(72) Inventor: David Tognarelli, Santa Barbara, CA (US)

(73) Assignee: WOW GEAR, LLC, Santa Barbara, CA (US)

( * ) Notice: Subject to any disclaimer, the term of this patent is extended or adjusted under 35 U.S.C. 154(b) by 6 days.

(21) Appl. No.: 18/445,545

(22) Filed: Oct. 10, 2023

(65) Prior Publication Data

US 2024/0245266 A1    Jul. 25, 2024

Related U.S. Application Data

(63) Continuation-in-part of application No. 29/885,886, filed on Mar. 2, 2023, now Pat. No. Des. 1,063,570.

(60) Provisional application No. 63/440,398, filed on Jan. 21, 2023.

(51) Int. Cl.
| | |
|---|---|
| *A47J 45/10* | (2006.01) |
| *A01B 1/02* | (2006.01) |
| *A47J 43/28* | (2006.01) |
| *B25G 3/02* | (2006.01) |

(52) U.S. Cl.
CPC .............. *A47J 45/10* (2013.01); *A01B 1/02* (2013.01); *A47J 43/288* (2013.01); *B25G 3/02* (2013.01)

(58) Field of Classification Search
CPC .......... A47J 43/18; A47J 43/28; A47J 43/288; A47J 15/10; A01B 1/04; A01B 1/14; A01B 1/02; B25G 3/02
USPC ...... 294/7, 50.6, 55.5, 131; 452/137; 30/323
See application file for complete search history.

(56) References Cited

U.S. PATENT DOCUMENTS

| | | | | |
|---|---|---|---|---|
| 416,849 | A * | 12/1889 | Neale | |
| 604,477 | A * | 5/1898 | Moritz | |
| 3,760,501 | A * | 9/1973 | Johnston | A47J 43/283 |
| | | | | 30/340 |
| 4,089,379 | A * | 5/1978 | Crownover | A01B 1/06 |
| | | | | 294/131 |
| 5,937,627 | A * | 8/1999 | McKittrick | A01B 1/06 |
| | | | | 294/58 |
| 10,244,677 | B2 * | 4/2019 | Texidor | A01D 7/10 |
| D935,287 | S * | 11/2021 | Sosa | D7/683 |
| 2021/0259474 | A1 * | 8/2021 | Ortega | A47J 43/281 |

* cited by examiner

*Primary Examiner* — Stephen A Vu

(74) *Attorney, Agent, or Firm* — Knobbe, Martens, Olson & Bear, LLP

(57) ABSTRACT

A hand tool is disclosed which provides for extension and protection of a person's hand while allowing for the manipulation of a food product, even over a hot oven or grill. The hand tool comprises the tool section, a handle, and a shield sleeve. The handle can be attached to the tool section or to the shield sleeve. In one embodiment, the tool section is reversibly attached to the shield sleeve, so that the tool is interchangeable with other tools.

20 Claims, 14 Drawing Sheets

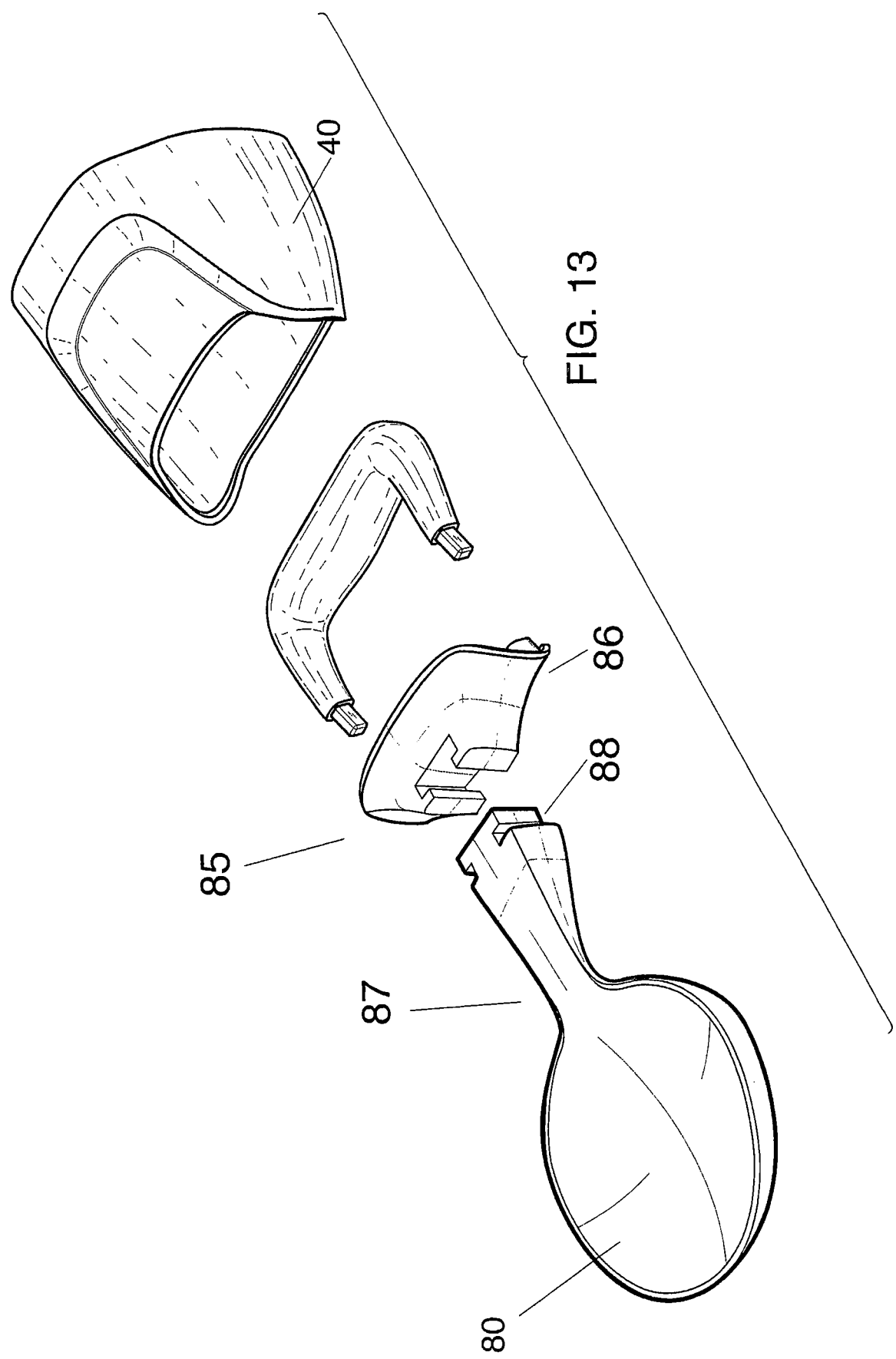

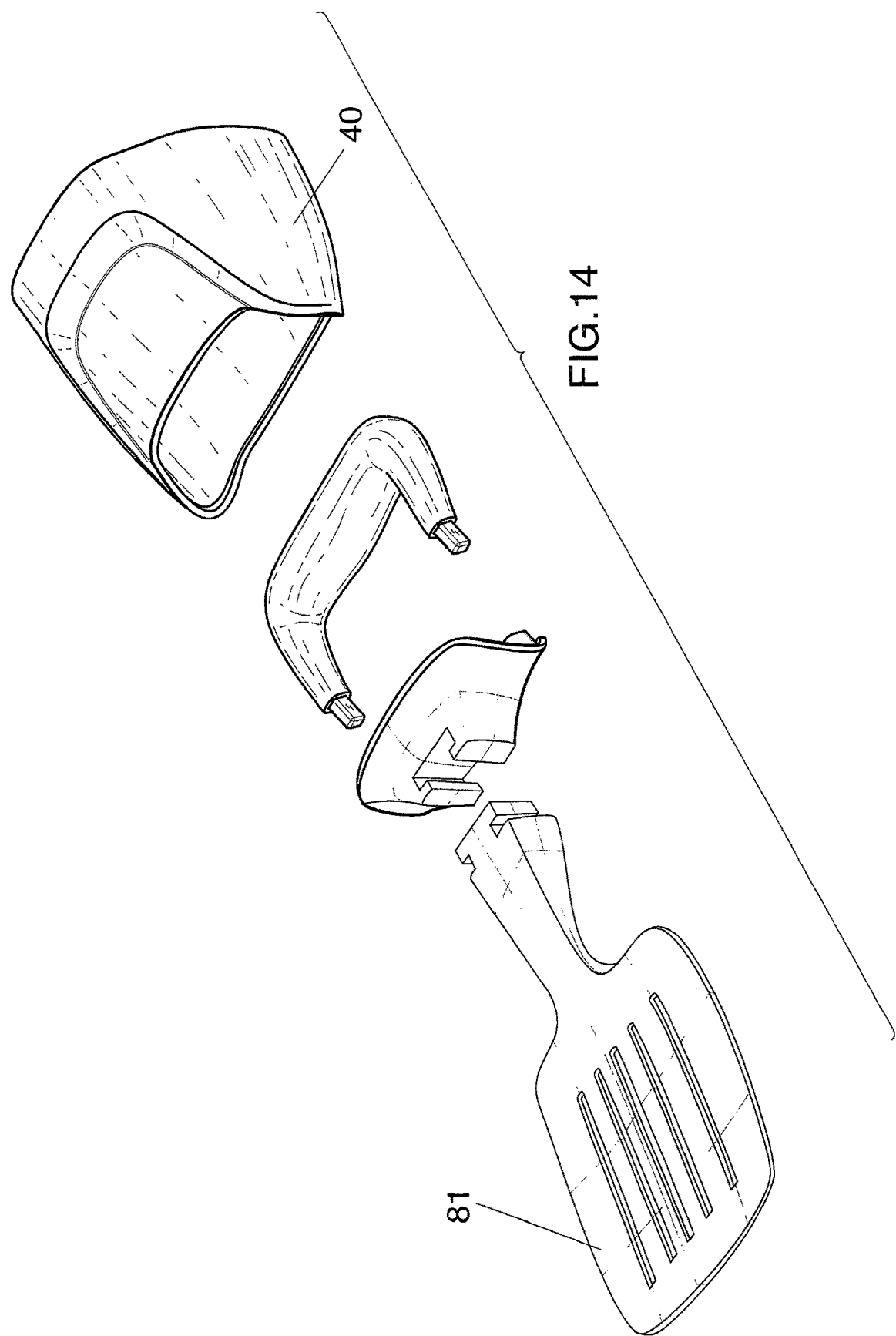

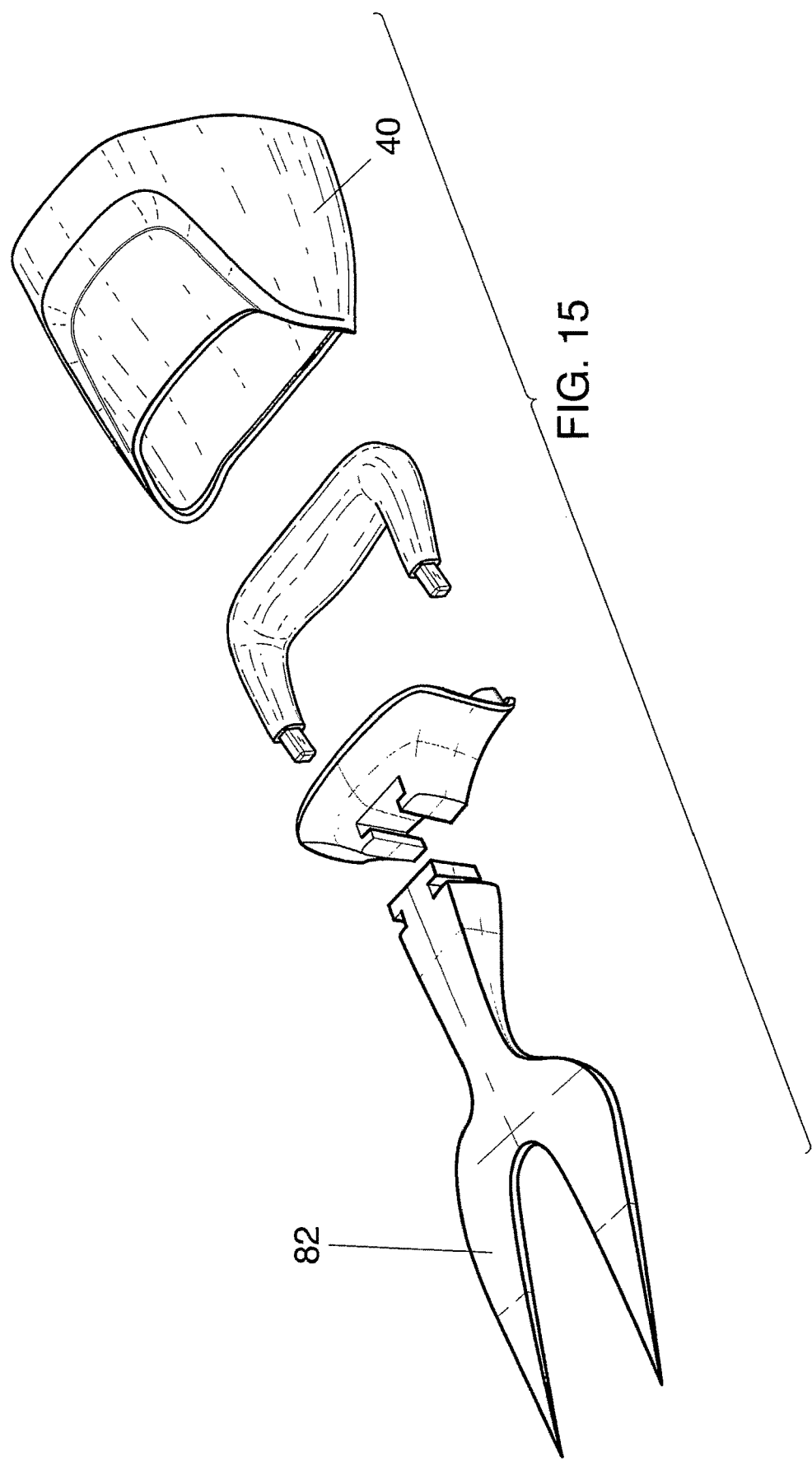

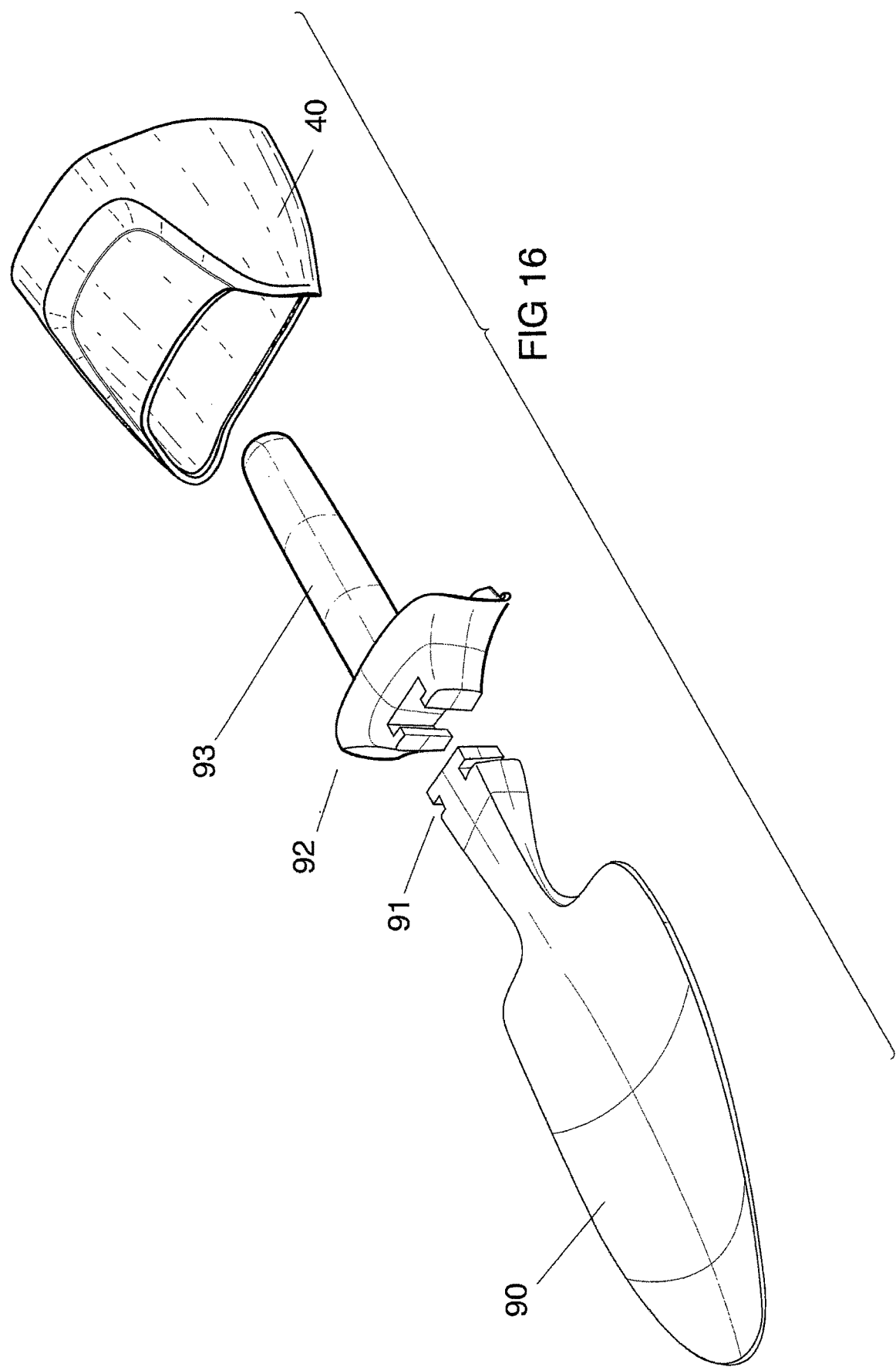

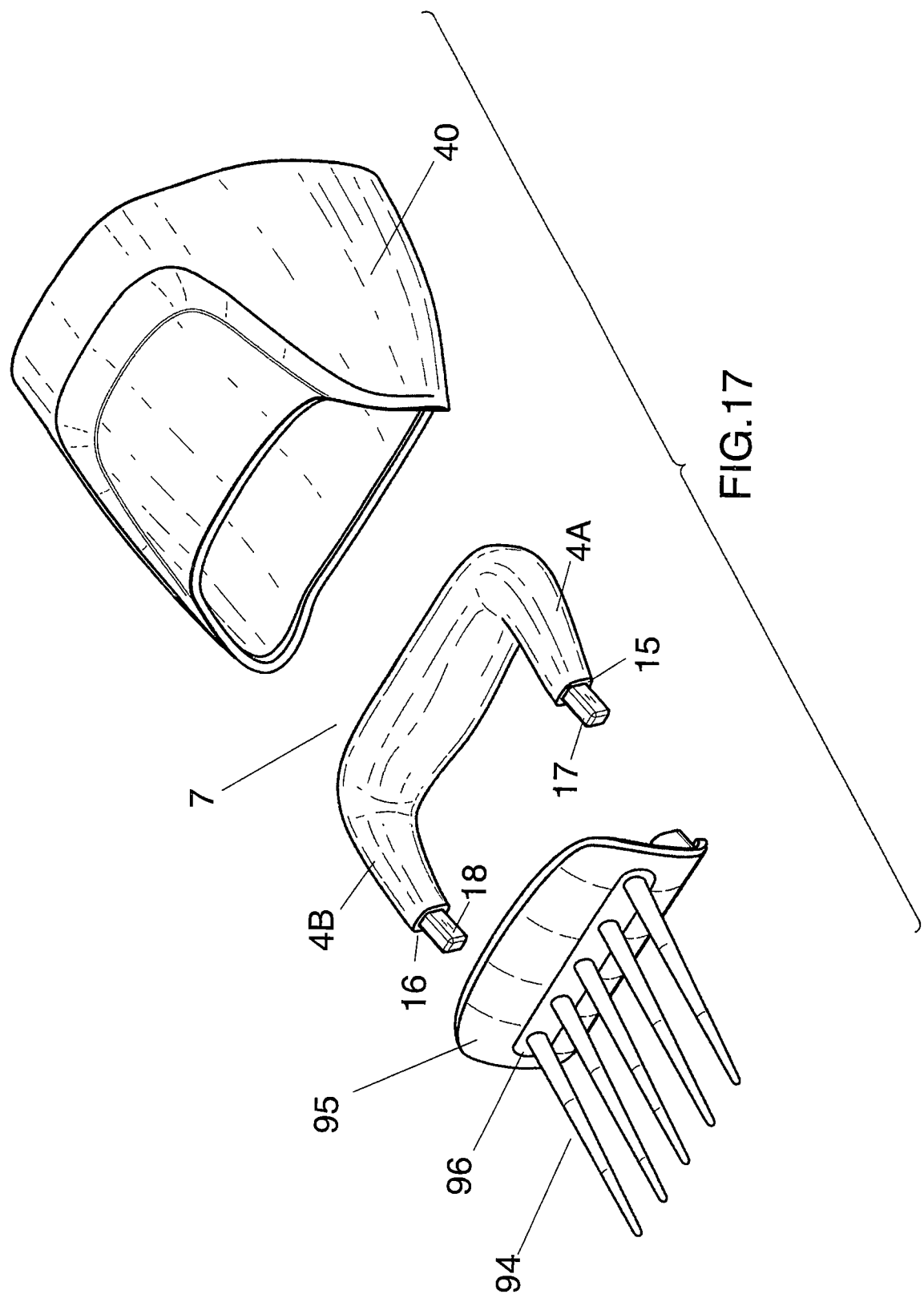

HAND TOOL

This application claims priority to US Design Application 29/885,886, filed Mar. 2, 2023 and U.S. Provisional Application No. 63/440,398, filed Jan. 21, 2023.

FIELD OF THE DISCLOSURE

This disclosure teaches a handheld tool with an interchangeable tool attachment.

BRIEF DESCRIPTION OF THE FIGURES

FIG. 13 is another embodiment of the disclosure wherein the tool is a spoon;
FIG. 14 is another embodiment of the disclosure wherein the tool is a spatula;
FIG. 15 is another embodiment of the disclosure wherein the tool is a fork;
FIG. 16 is an embodiment as a yard tool;
and
FIG. 17 is another embodiment of the yard tool.

DETAILED DESCRIPTION OF THE EMBODIMENT

Figure 1:
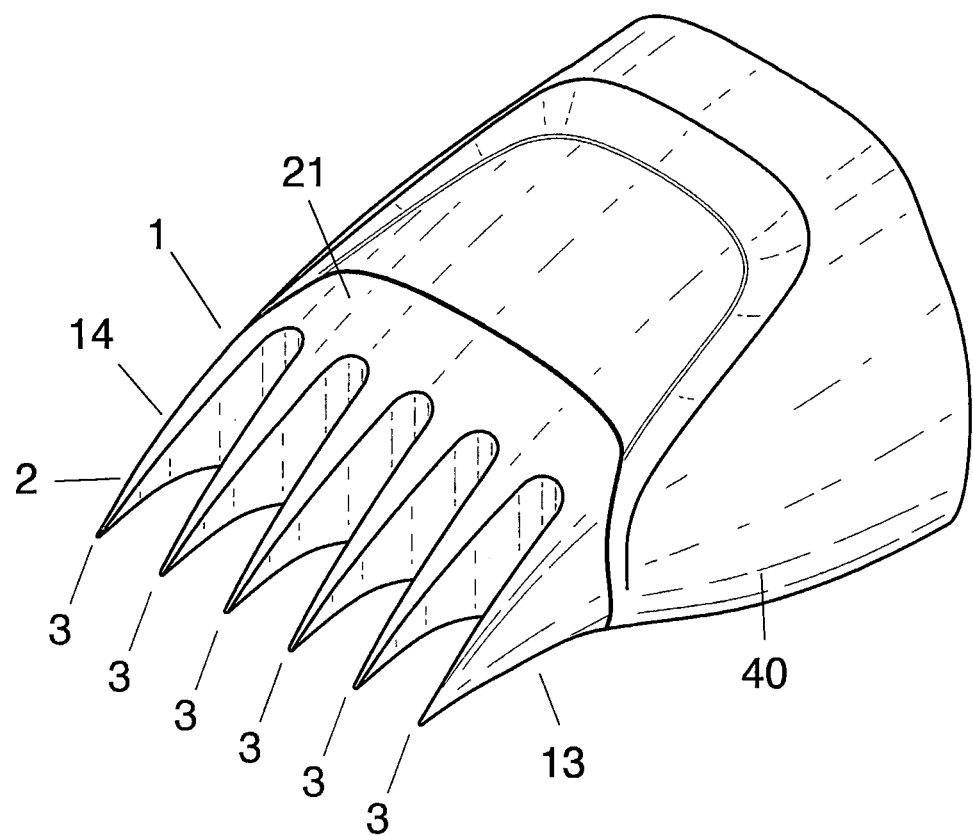
FIG. 1 is a front perspective view of a handheld food shredder.
Figure 2:
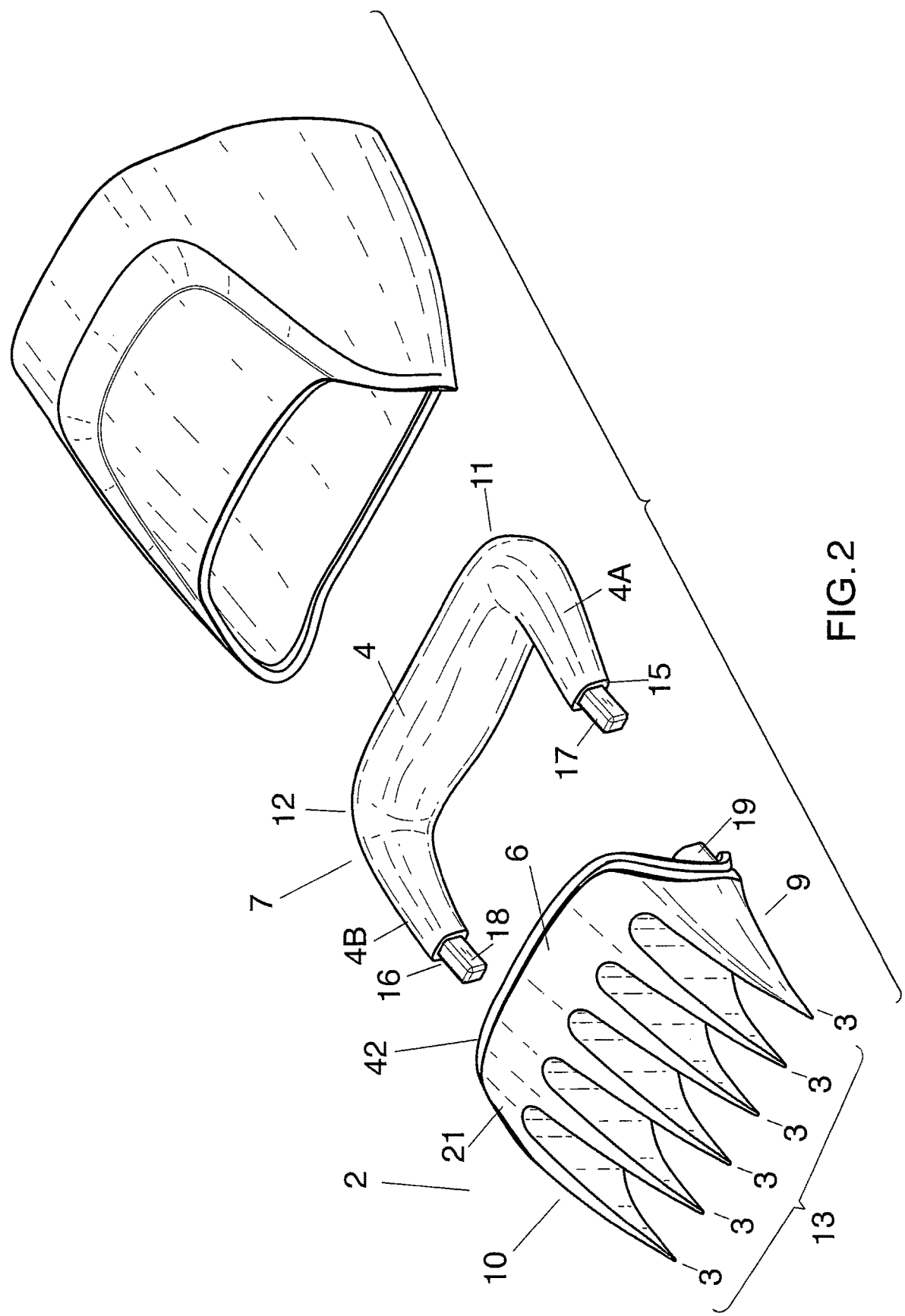
FIG. 2 is an exploded view thereof.
Figure 3:
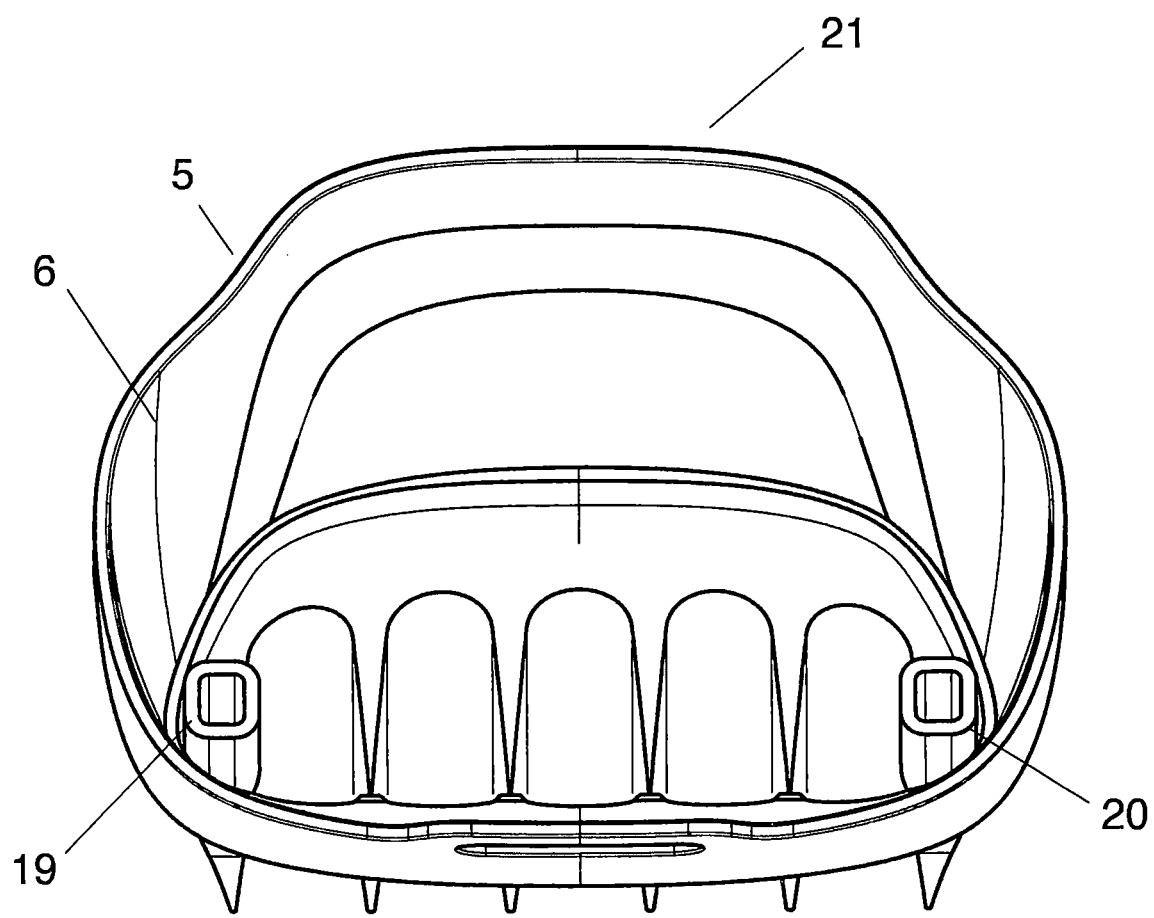
FIG. 3 is a rear perspective view of a handle positioned in the food shredder tool.
Figure 4:
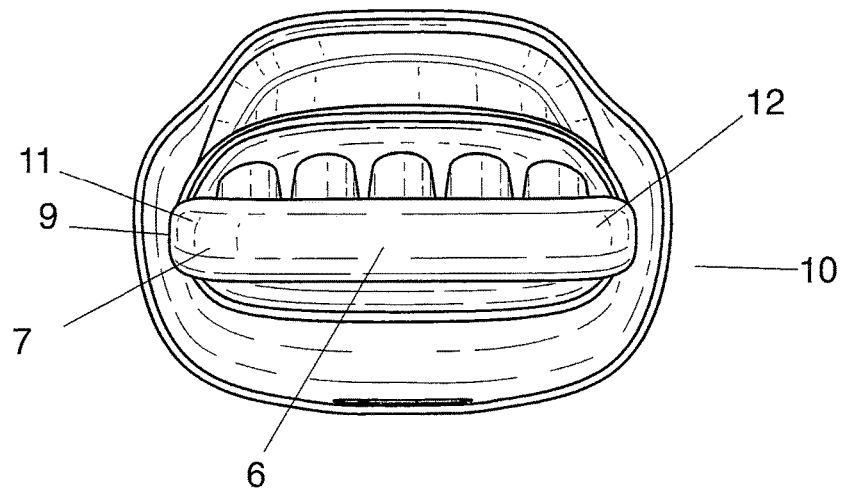
FIG. 4 is rear perspective view of another embodiment of the handle positioned in a tool attachment of the handheld food shredder.
Figure 5A:
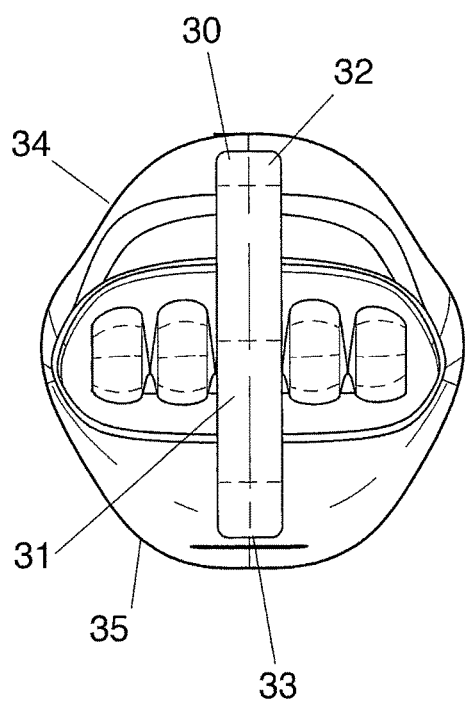
FIG. 5A is a rear view of yet another embodiment of the handle positioned in the tool attachment.
Figure 5B:
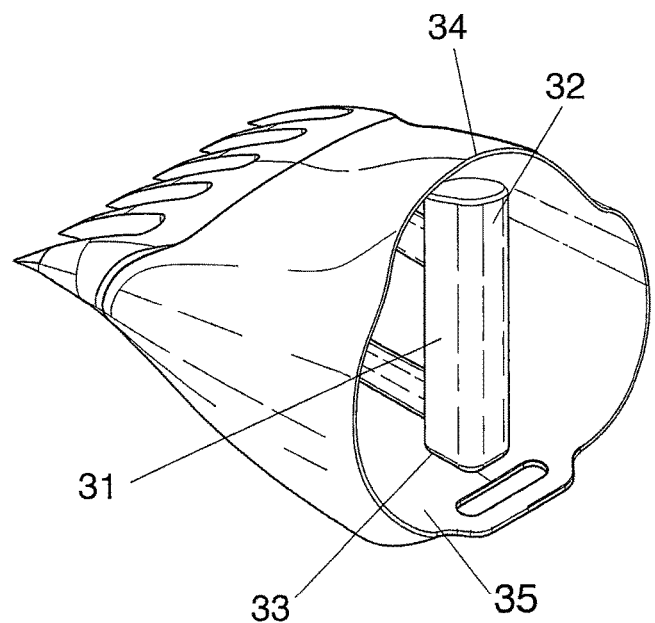
FIG. 5B is a rear perspective view of the embodiment of 5A.
Figure 6:
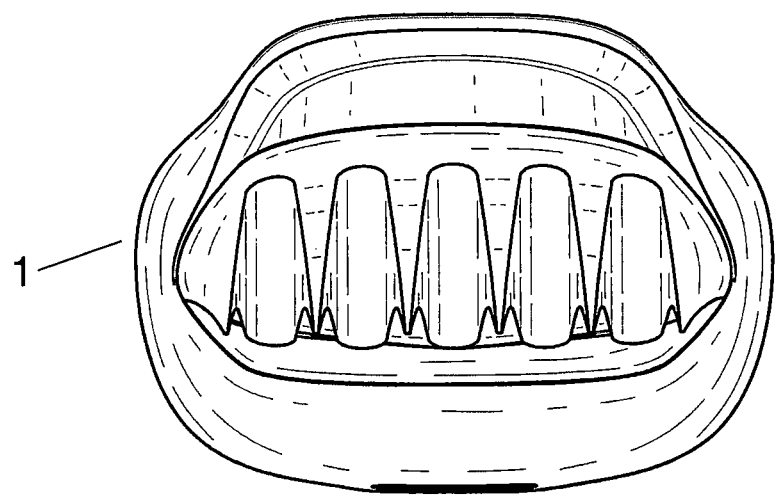
FIG. 6 is a front elevation view of the handheld food shredder.
Figure 7:
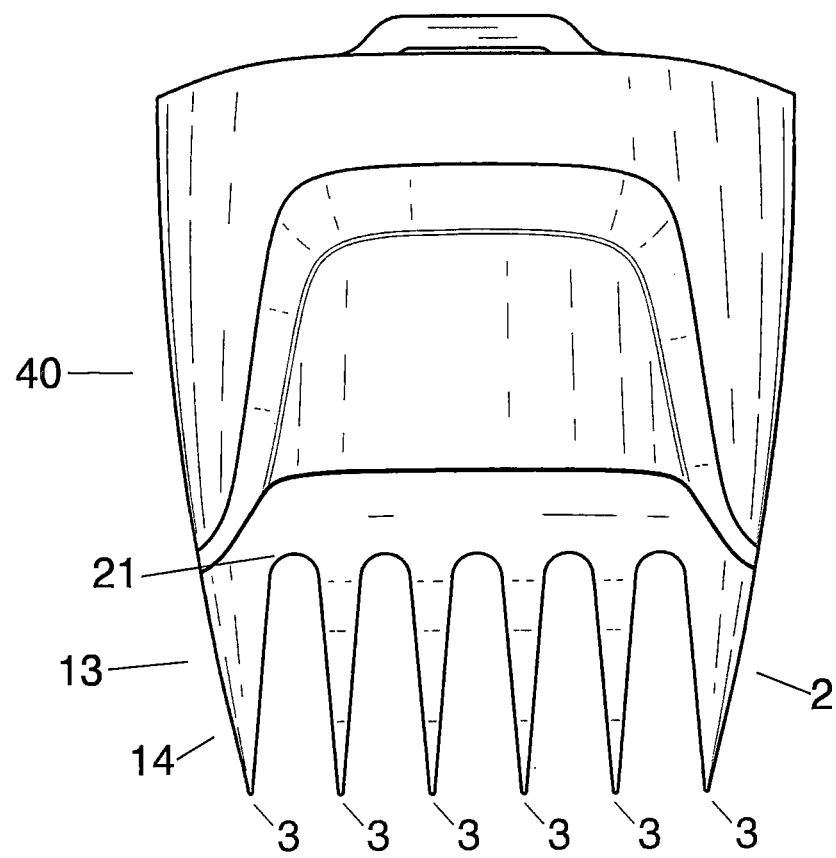
FIG. 7 is an overhead view thereof.
Figure 8:
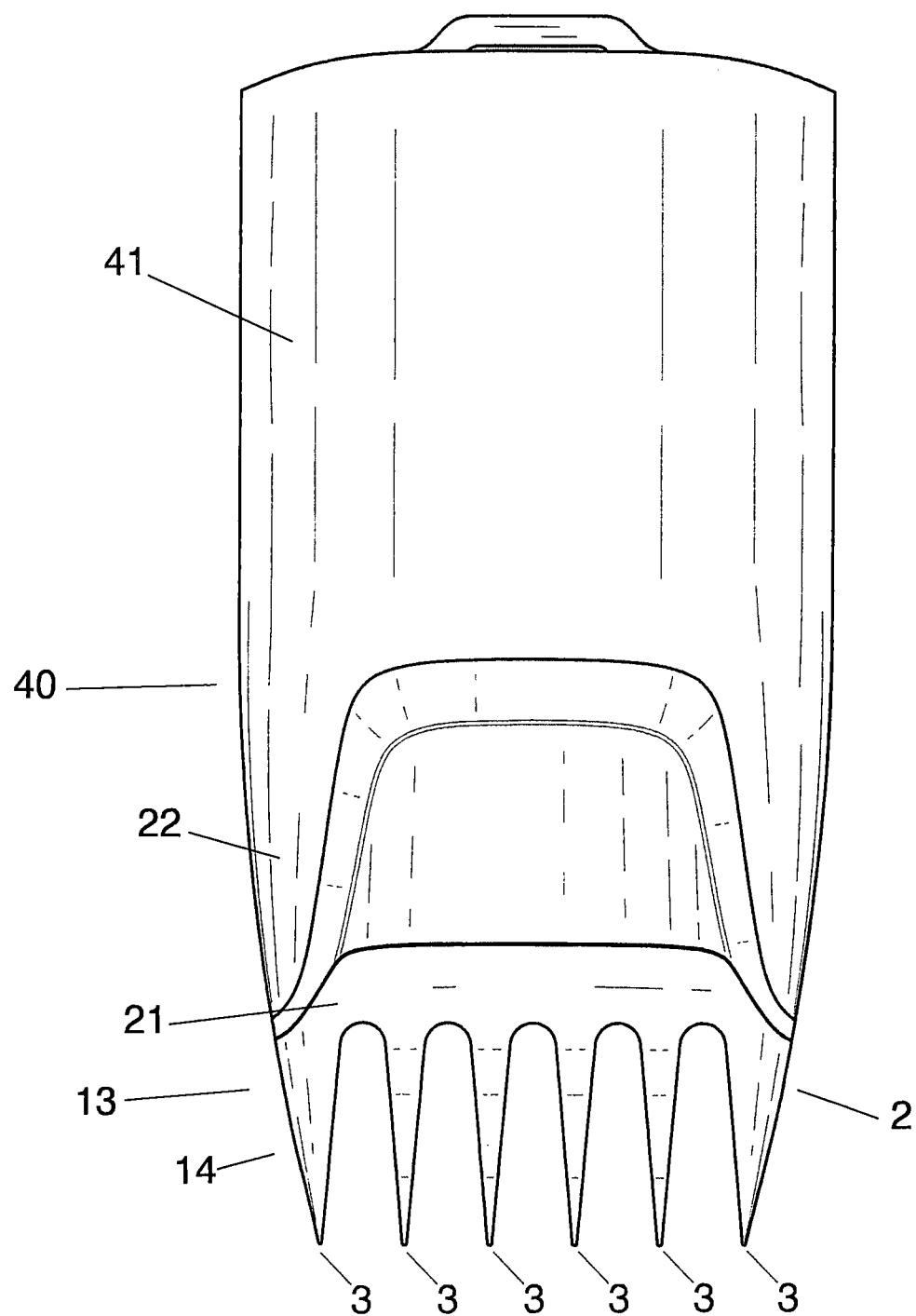
FIG. 8 is an overhead view showing a lengthened shield sleeve.

The present disclosure 1 is a hand tool for shredding and handling and retaining rigid and semi-rigid meats and food products during food preparation and cooking in the kitchen and at the barbecue. The hand tool 1 used for these purposes has three principal sections. The first section is the tool attachment 13, in this case, the shredder attachment 2 for shredding, gripping, and retaining rigid and semi-rigid meats and food products during food preparation and cooking in the kitchen and over a barbecue, or smoker. The second part of the tool is a handle 7 for holding the tool 1, and the third part is a soft or rigid shield sleeve 40 made of heat resistant rubber, silicone, plastic materials, cloth, or combinations thereof. The purpose of the shield sleeve is to protect the hands from hot and greasy liquids and juices resulting from the handling of hot and cold food products. The handle 7 allows for the gripping and controlling of the claw or attached tool. The handle 7 is made out of heat resistant plastic, metal or even wood.

In one embodiment, the tool attachment contains a claw or shredder tool 2. The claw has the capability of gripping meats and other foods by skewering the meat and food with the integrated tined body to rigidly retain the meat and food product for food preparation and processing. The same claw can also be used for shredding meats, removing meats from ovens, BBQ grills, and smokers, cutting boards. The claw can also be used to toss salads, vegetables and meats in a bowl, platter or pan.

More specifically, tool attachment 13 is comprised of two basic sections, the working tool section 14 of the tool attachment 13 which is integral with the tool support section 21. The shredder tool 2 has a plurality of shredding blades or tines 3 extending from the proximal side of the tool support section 21. The working tool section 14 can be molded with the tool support section as one piece. Other means of non-reversible attachment known in art can also be used. Attachment can also be by any means, including friction between the two parts, screws, etc.

In one embodiment, the shredding blades 3 are made out of plastic. In another embodiment, the shredding blades 3 are made out of metal. In yet another embodiment, the blades 3 are comprised of a metal coating over plastic. In yet another embodiment, hollow metal blades are molded to fit snuggly over the plastic blades. In one more embodiment, the entire shredder attachment 2 is made of metal. In yet another embodiment, the entire shredder is made of heat resistant plastic. In one embodiment of the disclosure, there is a lipped edge 42 on the rear side 6 of the distal end of the tool support section 21.

In one embodiment, the second principal section, a handle 7, is attached inside of the tool support section 21, which is itself hollow. In this embodiment, a U-shaped handle 7 fits between side 9 and side 10, within tool support section 21, wherein the grip section 4 of the handle 7 is perpendicular to the length of the shredder tool 2. At each end 11, 12 of the grip section 4 are the legs 4a and 4b of the grip action. At terminus 15, 16 of each of the legs 4a, 4b are spindles 17, 18, which fit securely and snuggly within respectively shaped openings 19, 20 positioned within the rear side 6 of the distal end 5 of the tool support section 21. The handle 7 is by any means known in the art, including glue, screws, etc.

In another embodiment, handle 7 just comprises grip section 4, with the ends 11, 12 attached directly to inside walls 9, 10. Any method of attachment may be used to attach the ends of the handle may be used.

In an alternative embodiment, the handle 30 is positioned vertically. This handle 30, similar to the handle 7 supra, has a grip section 31, with each end 32, 33 respectively attached to an inner top side 34 and inner bottom side 35. Attachment means are well known to the art and the handle may or may not have legs.

It should be noted that in one embodiment, the shredder tool 2 is used in tandem with a second shredder tool 2 on the user's alternative or second hand. In one embodiment, the second shredder tool 2 is identical to the first shredder tool.

To protect the hands of someone using the shredder tool 2, shield sleeve 40 that covers all or part of the hand of the user. In another embodiment, a shield sleeve 41 extends at least halfway up the lower arm of the user. In one embodiment, the shield sleeve 40 (as well as any alternative embodiments, including but not limited to shield sleeve 41) is made of plastic. In another embodiment, the shield sleeve 40 is made of silicon heat resistant rubber, nylon, any other flexible plastic, cloth or cloth like materials and combinations thereof. In yet another embodiment, the proximal end 22 of the shield sleeve 40 is made of any flexible material attached at the proximal end 22 to a plastic mating structure with the capability of attaching to the rear side of the distal end of the tool support section 21.

The mating or attachment of the shield sleeve 40 to the rear side 6 of the distal end 5 of the tool support section 21 can be accomplished in a number of different ways, most of which are known in the art. The shield sleeve 40 can be attached by compression molding or injection over-molding, injection molded as one homogeneous plastic part, or molded as a soft and stretchable member that is assembled on the rear side 6 of the distal end 5 of the tool support section 21 by stretching it over the tool support section 21 and a lipped edge 42.

Figure 9:
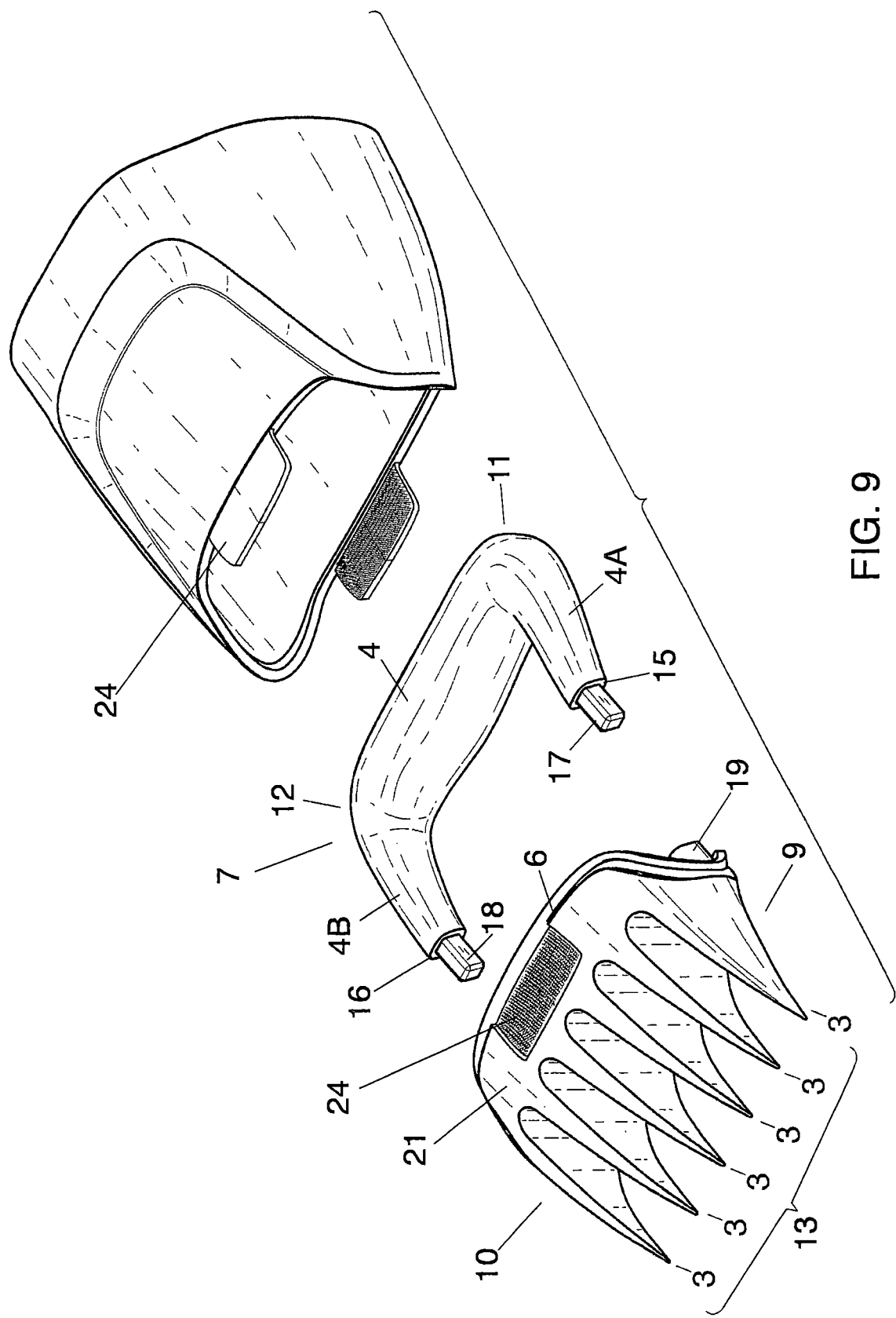
FIG. 9 is an exploded view of the handheld food shredder, showing an alternative feature not shown in FIG. 2.
Figure 10:
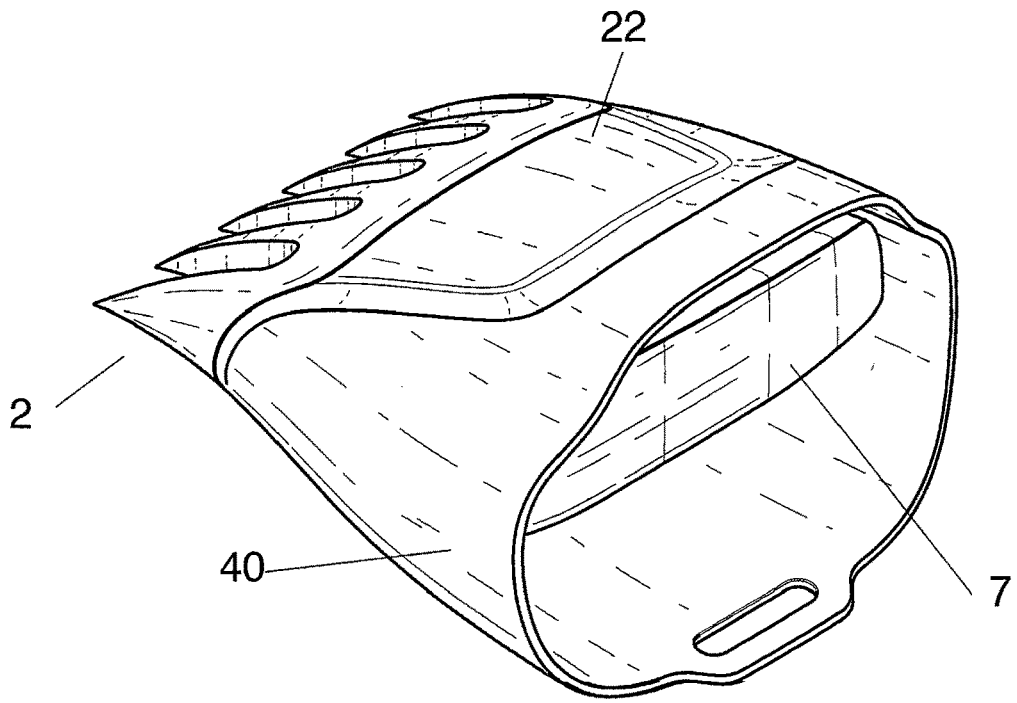
FIG. 10 is a rear perspective view of the shield sleeve.
Figure 11:
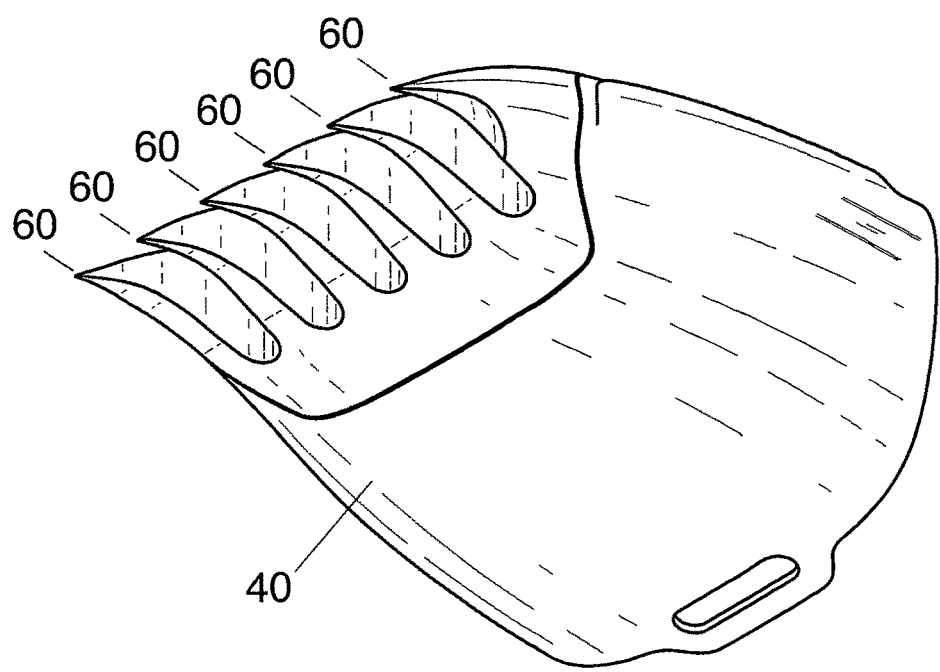
FIG. 11 is a bottom perspective view of the shield sleeve.

In one embodiment, sleeve 40 fits snugly over the rear side 6 of the distal end 5 of the tool support section 21 or, alternatively, the sleeve 40 fits snugly within the rear side 6 of the distal end 5 of the tool support section 2. In such a case, separation of the shredder attachment 2 and the sleeve 40 is accomplished by manipulating the sides by pressing on them until the two parts separate. In another embodiment the sleeve 40 is reversibly attached to the shredder attachment. Any number of different means can be used, including snaps, buttons (when the shield sleeve is flexible), or countless other means of attachment, including hook and loop strips 24 (FIG. 9).

There are a number of alternative designs for the kitchen tool. In one embodiment, the handle 7 is attached to the shield sleeve 40 instead of being attached to the shredder 2. In this embodiment, tabs are positioned at each end of the handle. These tabs fit through slits, each of which is fitted on either side of the sleeve 40, opposite each other. In this embodiment, the part of the sleeve 40 where the slits are positioned are plastic, rubber, or silicon or any material having a degree of rigidity.

In an alternative embodiment, the handle 7 is attached to the tool support section 21 the same way that the handle 7 is attached to the shield sleeve 40. In this embodiment, tabs of handle 7 fit through slits of walls 9, 10. In another embodiment, wherein the handle 7 is vertical to the length of the attachment tool 2, the tabs fit through slits in the top side 34 and the bottom side 35, respectively.

Figure 12:
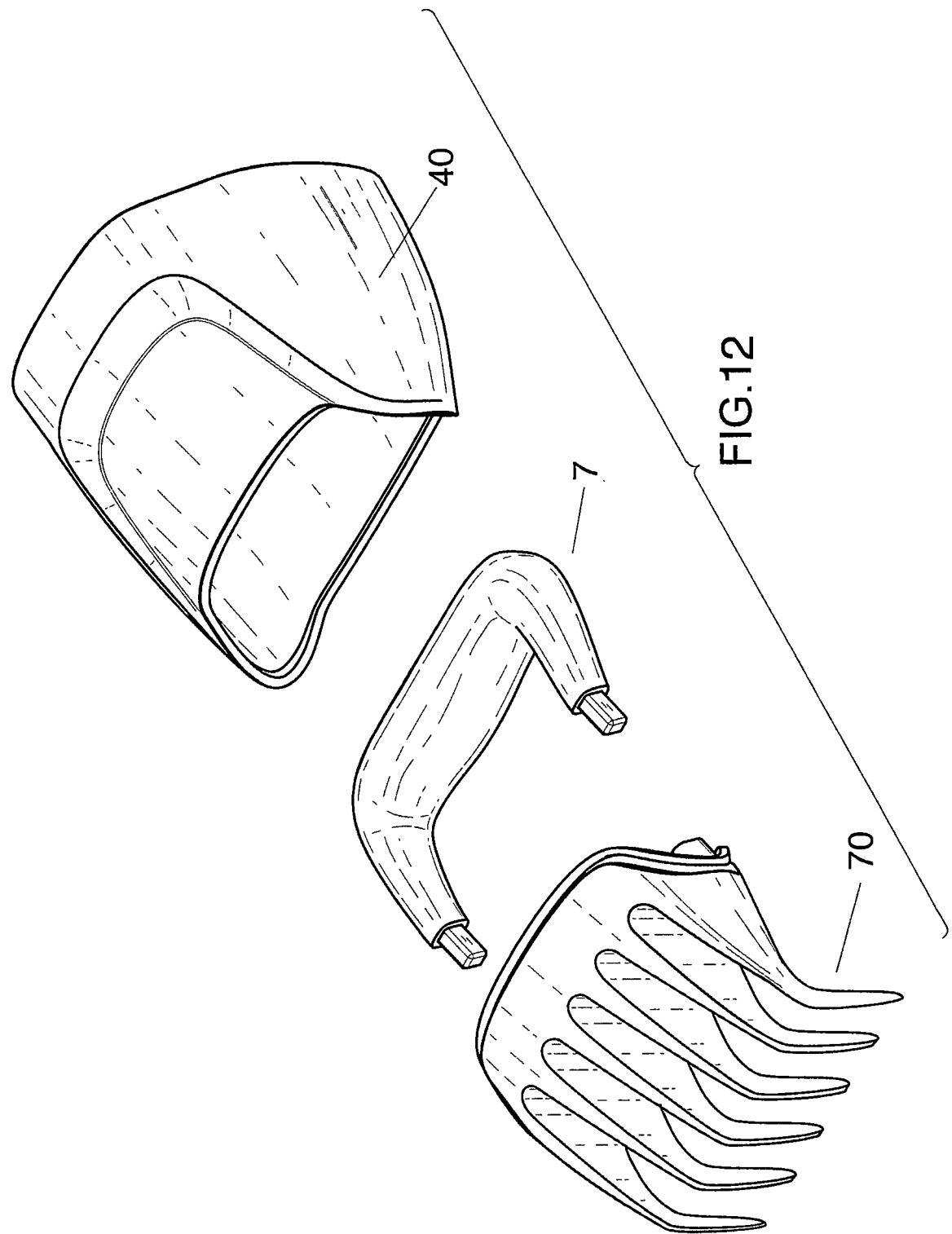
FIG. 12 is another embodiment of the tines.

There are a number of alternative embodiments of the disclosure. It should be noted that the shredder attachment can have downwardly pointing tines 70. In another embodiment, the tines 70 extend outward and then point down, as shown in FIG. 12.

In alternative embodiments, the shredder attachment can be removed, and replaced with other kitchen tools. For instance, a spoon tool attachment 80 can be used to toss salads or to stir hot soups. The spoon tool attachment 80 can include an attachment portion 87 with an end 88. The end 88 can attach to an end 86 of a base 85. In another embodiment an attachable spatula tool attachment 81 can be used, alone or in conjunction with another spatula tool attachment 81 or with a spoon tool attachment 80. In yet another couple of embodiments, a fork tool attachment 82 can be used as well to cut meat or for any other purpose. The tools attachments can be mixed and matched as needed.

In yet another embodiment, the tool can have attachments such that it can be used as a yard tool. As an example, an attachable tool 90 is attached. In one embodiment, the spade tool has at its distal end a male locking attachment piece 91 which can fit into a female tool attachment piece 92 integral with the tool support section 21. In another embodiment, the female and male tool means of linking are reversed. Any method of attachment known in the art can be used to reversibly secure the male locking attachment piece to the female tool attachment piece. Other methods of reversible attachment can be used, other than a male-female attachment, including screws, bolts, etc. in overlapping pieces. In another embodiment, there is a permanent attachment between the handle and the tool, in such cases where there is no interchangeability of the tool. Similarly, and in all cases described supra, the shield sleeve may be used interchangeably and in other cases, the shield sleeve is not interchangeable with other tools.

A handle 93 is attached to the rear of the tool support section by any method described or known in the art. In one embodiment, the handle 93 is positioned along the x axis of tool 1. In another embodiment, the handle is positioned between the two sides of the shield sleeve 40. It should be noted that all of the arrangements of the handle may be used with any of the tools or food implements. Other yard tools that can be attached include a hand trowel, a weeder, transplanter, cultivator and rake.

In FIG. 17, the tool, in this case a plurality of soil breaking tines 94 are connected and attached to a base 96 which in turn is connected to the tool support section 95. Handle 7 is connected to the rear of the tool support section 95, and the hand shield 40 fits over the handle 7 and connects to the tool support section by any means known, including force, glue, the tool support section fitting within grooves, and all other methods discussed supra.

While various embodiments of the present disclosure have been described above, it should be understood that they have been presented by way of example only, and not limitation. It will be apparent to people skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents.

I claim:

1. A hand tool configured for gripping and shredding food products, the hand tool comprising:
   a tool attachment, said tool attachment comprising:
      a working tool section comprising a plurality of hollow claws; and
      a tool support section connected to the working tool section, the tool support section comprising an outer surface with a lipped edge, a first lateral side, and a second lateral side;
   a shield sleeve connected to the tool support section, the shield sleeve comprising a flexible end having an inner surface that matingly engages with the lipped edge of the tool support section, wherein an exterior surface of the shield sleeve is generally flush with an exterior surface of the tool support section where the shield sleeve connects to the tool support section; and
   a handle connected to the first lateral side of the tool support section and to the second lateral side of the tool support section, the handle positioned within the shield sleeve such that user's hand can be received in and protected by the shield sleeve while grasping the handle to manipulate the plurality of hollow claws for gripping and shredding food products.

2. The hand tool of claim 1, wherein the first lateral side and the second lateral side are the right side and left side of the tool support section such that the handle is positioned horizontally when the handle is connected to the tool support section.

3. The hand tool of claim 1, wherein the shield sleeve is removably attached to the tool support section.

4. The hand tool of claim 1, wherein the working tool section is removably attached to the tool support section.

5. The hand tool of claim 1, wherein the working tool section and the tool support section are integrally molded.

6. The hand tool of claim 1, wherein the plurality of hollow claws are arranged side-by-side from the first lateral side to the second lateral side opposite the first lateral side.

7. The hand tool of claim 1, wherein the tool support section is hollow, wherein the handle is connected to the first lateral side of the tool support section and to the second lateral side of the tool support section within the hollow tool support section.

8. The hand tool of claim 1, wherein the handle is generally U-shaped.

9. The hand tool of claim 1, wherein the shield sleeve comprises silicone.

10. A pair of food shredders, each of the pair of food shredders comprising:
   a claw portion comprising a front end and a rear end, the front end having a plurality of claws that are arranged side-by-side from a first lateral to a second lateral side opposite the first lateral side, the rear end having a first attachment on the first lateral side and a second attachment on the second lateral side;
   a handle comprising a grip section, a first end, and a second end, the grip section parallel to the side-by-side arrangement of the plurality of claws, the first end of the handle connected with the first attachment on the first lateral side of the claw portion, the second end of the handle connected with the second attachment on the second lateral side of the claw portion; and
   a shield sleeve connected to the rear end of the claw portion, the shield sleeve configured to receive a hand of a user;
   wherein the first and second ends of the handle are positioned inside the claw portion and the grip section of the handle is positioned inside the shield sleeve.

11. The food shredders of claim 10, wherein the shield sleeve is reversibly attached to the rear end of the claw portion.

12. The food shredders of claim 10, wherein the first end of the handle is reversibly attached with the first attachment, and the second end of the handle is reversibly attached with the second attachment.

13. The food shredders of claim 10, wherein the claw portion and the handle are integrally molded.

14. The food shredders of claim 10, wherein the shield sleeve comprises a flexible end having an inner surface that matingly engages with a lipped edge of the rear end of the claw portion.

15. The food shredders of claim 10, wherein the rear end of the claw portion comprises a first opening shaped to receive the first end of the handle and a second opening shaped to receive the second end of the handle when the handle is connected to the rear end of the claw portion.

16. A hand tool configured for gripping and shredding food products, the hand tool comprising:
   a claw portion comprising a front end and a rear end, the front end comprising a plurality of claws that are arranged side-by-side from a first lateral to a second lateral side opposite the first side, the rear end comprising an outer surface;
   a handle comprising a grip section, a first end, and a second end; and
   a shield sleeve connected to the rear end of the claw portion, the shield sleeve comprising a front end with an opening, the opening receiving the rear end of the claw portion, the front end of the shield sleeve compressing against the outer surface of the rear end of the claw portion;
   wherein the handle is positioned within the shield sleeve such that a user's hand can be received in and protected by the shield sleeve while grasping the handle to manipulate the plurality of claws for gripping and shredding food products.

17. The hand tool of claim 16, wherein the first end of the handle is connected to a first lateral side of the rear end of the claw portion and the second end of the handle is connected to a second lateral side of the rear end of the claw portion.

18. The hand tool of claim 17, wherein the handle is positioned substantially horizontal to the side-by-side arrangement of claws.

19. The hand tool of claim 16, wherein the rear end of the claw portion comprises a first opening shaped to receive the first end of the handle and a second opening shaped to receive the second end of the handle when the handle is connected to the rear end of the claw portion.

20. The hand tool of claim 16, wherein an exterior surface of the shield sleeve is generally flush with an exterior surface of the rear end of the claw portion when the shield sleeve is connected to the rear end of the claw portion.

* * * * *